United States Patent [19]

Shawl

[11] Patent Number: 5,670,578

[45] Date of Patent: Sep. 23, 1997

[54] CEMENT ADDITIVES

[75] Inventor: Edward T. Shawl, Wallingford, Pa.

[73] Assignee: ARCO Chemical Technology, L.P., Greenville, Del.

[21] Appl. No.: 762,581

[22] Filed: Dec. 10, 1996

[51] Int. Cl.$^6$ ............................................ C08L 71/02
[52] U.S. Cl. .......................... 525/187; 106/823; 106/810; 106/728
[58] Field of Search ................... 106/823, 810, 106/728; 525/187

[56] References Cited

U.S. PATENT DOCUMENTS

| | | | |
|---|---|---|---|
| 4,473,406 | 9/1984 | Bradley et al. | 106/90 |
| 4,524,163 | 6/1985 | Bradley et al. | 524/5 |
| 4,792,360 | 12/1988 | Pierce et al. | 106/90 |
| 4,808,641 | 2/1989 | Yagi et al. | 524/5 |
| 4,814,014 | 3/1989 | Arfaei | 106/90 |
| 4,870,120 | 9/1989 | Tsubakamoto et al. | 524/5 |
| 4,888,059 | 12/1989 | Yamaguchi et al. | 106/314 |
| 4,946,506 | 8/1990 | Arfaei et al. | 106/724 |
| 4,946,904 | 8/1990 | Akimoto et al. | 525/327 |
| 4,968,734 | 11/1990 | Gaidis et al. | 524/5 |
| 4,972,025 | 11/1990 | Tsubakamoto et al. | 525/329 |
| 4,978,392 | 12/1990 | Kilbarger et al. | 106/95 |
| 5,142,036 | 8/1992 | Akimoto et al. | 536/18.3 |
| 5,162,402 | 11/1992 | Ogawa et al. | 524/5 |
| 5,362,324 | 11/1994 | Cerulli et al. | 106/823 |
| 5,393,343 | 2/1995 | Darwin et al. | 106/808 |
| 5,436,314 | 7/1995 | Yang et al. | 528/274 |
| 5,476,885 | 12/1995 | Tahara et al. | 524/4 |
| 5,478,521 | 12/1995 | Scheiner | 264/333 |
| 5,494,516 | 2/1996 | Ors et al. | 106/819 |
| 5,556,460 | 9/1996 | Berke et al. | 106/823 |
| 5,614,017 | 3/1997 | Shawl | 526/318 |
| 5,618,782 | 4/1997 | Gopalkrishnan et al. | 510/418 |

FOREIGN PATENT DOCUMENTS

| | | |
|---|---|---|
| 0725043 | 8/1996 | European Pat. Off. . |
| H375252 | 3/1991 | Japan . |
| H5213644 | 8/1993 | Japan . |
| 2280180 | 1/1995 | United Kingdom . |
| 2285048 | 6/1995 | United Kingdom . |
| 9528362 | 10/1995 | WIPO . |
| 9700898 | 1/1997 | WIPO . |
| 9711132 | 3/1997 | WIPO . |

OTHER PUBLICATIONS

*Chemical Abstracts* 99:145063b, "Dispensing Agents for Cement", JP 58 74,552.

*Chemical Abstracts* 105:84233A "Cement Admixture", JP 61 31,333.

*Primary Examiner*—Melvyn I. Marquis
*Attorney, Agent, or Firm*—Stephen D. Harper

[57] ABSTRACT

Substances useful as water reducing and superplasticizer additives for cement compositions are formed by reaction of carboxylic acid polymers with a mixture of monofunctional and difunctional polyethers derived from $C_2$–$C_4$ epoxides wherein partial cleavage of the polyethers and esterification of the polyethers and the cleavage products thereof by the other reactant are achieved. In one embodiment, a sulfonic acid is used to catalyze the reaction of poly(acrylic acid), a monofunctional ethylene oxide-propylene oxide copolymer, and a difunctional poly(propylene glycol), at a temperature in excess of 140° C.

21 Claims, No Drawings

CEMENT ADDITIVES

BACKGROUND OF THE INVENTION

1. Field of the Invention

The present invention relates to the use of polymeric substances comprised of the reaction product of a carboxylic acid polymer such as polyacrylic acid and a mixture of monofunctional and difunctional polyethers derived from one or more $C_2$-$C_4$ epoxides as additives for cement. The invention also pertains to cement compositions containing these additives. The additives function as water reducers and super plasticizers.

2. Description of the Related Art

Additives for cement to increase the fluidity of cement paste, mortars and concretes have been known and in use for many years. These additives are also known as water reducers because they allow less water to be used in a mortar or concrete without loss of slump (a measure of consistency or workability). This class of cement additives permits the use of less water to obtain the same slump, or the attainment of a higher slump at a given water content, or the use of less portland cement to realize the same compressive strength. The performance requirements for water reducing admixtures are specified in ASTM Method C494-92, "Standard Specifications for Chemical Admixtures for Concrete".

In ASTM C494-92, a water reducing admixture is defined as an admixture that reduces the quantity of mixing water required to produce concrete of a given consistency by at least 5%.

A high range water reducing admixture, also known as a superplasticizer, reduces the quantity of mixing water required to produce concrete of a given consistency by 12% or greater. Commercial water reducing admixtures including lignin sulfonates and naphthalene sulfonate-formaldehyde condensates. More recently, new classes of flow enhancers or water reducers have been described. U.S. Pat. No. 4,814,014 describes a cement composition containing a graft co-polymer containing a polymeric backbone moiety and polymeric side chain moieties wherein one of the polymeric moieties is a polyether moiety and the other is a non-polyether formed by polymerization of ethylenically unsaturated monomers. U.S. Pat. No. 5,393,343 describes a cement composition containing an imidized acrylic polymer made, for example, by reacting a polyacrylic acid of 2000 molecular weight with a ethylene oxide/propylene oxide copolymer of 2000 molecular weight terminated at one end by a primary amine group and at the other end by a methyl group.

A new class of cement superplasticizers obtained by reaction of carboxylic acid polymers with polyethers was described in prior application U.S. Ser. No. 08/621,669, filed Mar. 26, 1996, incorporated herein by reference in its entirety. These materials, when added at 0.1 weight % to 0.3 weight % levels to cement, typically provide water reduction of from 5% to 20%. However, substantial amounts of air are often entrained in mortar mixes prepared using such additives. Some air entrainment is also observed in concrete containing additives of this type. Excessive air entrainment substantially reduces the compressive strength of a cementitous composition and thus is normally undesirable. To overcome this problem, a defoamer such as tributyl phosphate or the like must be added to the cement mixture. The amount of defoamer needed will depend upon the particular cement and aggregate used and on the field conditions; the need for a defoamer is a disadvantage for cement additives of this type. Other polyether-based water reducers known in the art also generally exhibit a similar tendency to entrain excessive amounts of air. It therefore would be highly desirable to develop new water reducing agents for use in cement which have minimal air entrainment properties.

SUMMARY OF THE INVENTION

In accordance with the present invention, it has been found that the reaction products of certain carboxylic acid polymers and mixtures of certain polyethers are unexpectedly effective as water reducing additives or superplasticizers in cement. In contrast to other conventional superplasticizers based on polyethers, the reaction products of the present invention perform well even at dosages as low as 0.1 weight % on cement and do not entrain air to a significant extent.

DESCRIPTION OF THE PREFERRED EMBODIMENTS

The carboxylic acid polymers utilized in the preparation of the cement additives of the invention are comprised, in whole or in part, of one or more polymerizable acid monomers characterized by the presence of at least one polymerizable ethylenically unsaturated group in conjugation with a carboxylic acid, carboxylic anhydride or carboxylic ester group. "Acid" in this context thus refers to any moiety capable of functioning as an equivalent to or precursor of a free carboxylic acid group. Such monomers include monomers corresponding to the structure

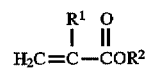

wherein $R^1$ and $R^2$ are each independently hydrogen or $C_1$-$C_4$ alkyl (e.g., methyl, ethyl, propyl, butyl). Other suitable monomers include cyclic unsaturated anhydrides and unsaturated dicarboxylic acids and $C_1$-$C_4$ alkyl esters thereof. Preferred acid monomers include, but are not limited to, acrylic acid, methacrylic acid, methyl methacrylate, methyl acrylate, maleic acid, maleic anhydride and combinations thereof. The carboxylic acid may be present in salt form, i.e., where $R^2$ is replaced with alkali metal, alkaline earth metal, ammonium, or the like. The carboxylic acid polymer thus may be in acid, partially neutralized, or fully neutralized salt form.

In certain embodiments of the invention, the polymer is comprised of repeating units having the structure

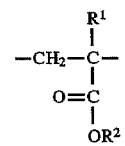

wherein $R^1$ is H or $C_1$-$C_4$ alkyl and $R^2$ is H, $C_1$-$C_4$ alkyl, alkali metal (e.g., Na,K), alkaline earth metal, or ammonium (e.g., $NH_4$, mono-, di-, or trialkylammonium, or quaternary ammonium); or

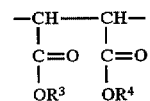

wherein $R^3$ and $R^4$ are the same or different and have the same meaning as $R^2$ above; or

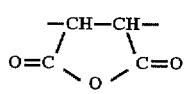

In one embodiment of the invention, the carboxylic acid polymer consists essentially of the acid monomer(s) in polymerized form (i.e., the acid monomer may comprise up to 100% of the polymer). However, satisfactory results may also be obtained even where the acid monomer is copolymerized with a different type of polymerizable monomer such as ethylene, or other ethylenically unsaturated compound. Preferably, however, at least 25 mole % of the repeating units in the polymer are repeating units of the acid monomer. Acrylic acid homopolymer is particularly useful in the present invention. Aqueous solutions of solutions of poly(acrylic acid) containing from 30 to 70% solids and having molecular weights of between 1000 and 4,000,000 are available from commercial sources such as BASF (under the trademark "Sokalan PA") and Aldrich Chemical Company. Poly(acrylic acid) is also commercially available in solid form.

In another preferred embodiment of the invention, a copolymer of maleic acid and acrylic acid is utilized. Such materials are available in solid or aqueous solution form from BASF under the trademark Sokalan CP (molecular weight=3000 to 70,000).

Other examples of carboxylic acid polymers suitable for use in the present invention include, but are not limited to, poly(ethylene-co-acrylic acid), poly(ethylene-co-methacrylic acid), poly(ethylene-co-maleic anhydride), and poly(methylmethacrylate-co-methacrylic acid).

The precise molecular weight of the carboxylic acid polymer is not particularly critical and may be varied as desired to control the properties of the resulting cement additive. Typically, however, the polymer has a number average molecular weight of from 500 to 2,000,000. In one preferred embodiment of the invention, the number average molecular weight ranges from 500 to 10,000.

The other reactant utilized in the synthesis of the cement additives of the present invention is a mixture of polyethers, each of which is comprised of, in polymerized form, one or more $C_2$–$C_4$ epoxides. One polyether is monofunctional (i.e., contains one hydroxyl group per molecule), while the other polyether is difunctional (i.e., contains two hydroxyl groups per molecule). The polyethers may thus be homopolymers or copolymers having repeating units linked by ether linkages with two carbon atoms separating each ether linkage. Preferred $C_2$–$C_4$ epoxides include propylene oxide, ethylene oxide, and mixtures thereof. For example, the mole ratio of oxyethylene to oxypropylene repeating units in the polyethers may vary from 1:99 to 99:1. The polyethers may be derived from the same $C_2$–$C_4$ epoxide or mixture of $C_2$–$C_4$ epoxides; alternatively, different $C_2$–$C_4$ epoxides may be used to prepare the monofunctional and difunctional polyethers. In one preferred embodiment of the invention, the difunctional polyether is a homopolymer of propylene oxide (i.e., polypropylene glycol). Generally speaking, the incorporation of higher proportions of oxyethylene repeating units in the polyether mixture will tend to increase the water solubility of the resulting cement additive. However, the use of oxyalkylene repeating units derived from substituted epoxides such as propylene oxide and 1-butene oxide tends to increase the susceptibility of the polyethers to undergo the desired partial cleavage during reaction with the carboxylic acid polymer. The polyether may additionally contain repeating units other than those derived from $C_2$–$C_4$ epoxides. Copolymers of $C_2$–$C_4$ epoxides with other cyclic ethers such as oxetanes, oxolanes (e.g., tetrahydrofuran), and the like may be used to advantage, for example.

The precise molecular weights of the polyether reactants are not considered critical, but may typically range from 500 to 20,000 (number average). The compositions and molecular weights of the polyethers are desirably selected such that the cement additive obtained from the polyether is water-soluble. It is desirable to control the amount of difunctional polyether relative to monofunctional polyether in order to avoid excessive crosslinking, which tends to reduce the solubility of the product derived therefrom in water. The weight ratio of monofunctional to difunctional polyether thus is typically maintained in the range 3:1 to 25:1.

Polyethers corresponding to the foregoing description are well-known in the art and may be readily obtained from a number of commercial sources. Methods for their preparation include, for example, the base-catalyzed or double metal cyanide complex-catalyzed reaction of $C_2$–$C_4$ epoxide (s) with a suitable initiator having one or two active hydrogen atoms. The monofunctional polyether may be obtained by polymerizing a $C_2$–$C_4$ epoxide onto a mono-functional initiator (i.e., a compound having a single active hydrogen atom such as a mono-alcohol) such as a $C_1$–$C_{10}$ aliphatic alcohol (e.g., methanol, ethanol, n-propanol), glycol ether (e.g., propylene glycol monomethyl ether, diethylene glycol mono-t-butyl ether, tripropylene glycol monomethyl ether) or the like. The difunctional polyether may be prepared by polymerizing a $C_2$–$C_4$ epoxide onto a difunctional initiator (i.e., a compound having two active hydrogen atoms such as a di-alcohol) such as a glycol (e.g., propylene glycol, ethylene glycol, 1,4-butanediol and the like) and oligomers thereof (e.g., tripropylene glycol, diethylene glycol). The polyethers may also be recycled materials recovered by glycolysis or hydrolysis from a polyurethane foam or the like.

The precise relative proportions of the foregoing reactants are not critical, except that the number of equivalents of polyether mixture reacted should be less than the number of equivalents of the carboxyl groups in the carboxylic acid polymer. That is, the number of hydroxyl groups in the former reactant per carboxyl group in the latter reactant is selected to be less than 1, more preferably, less than 0.5, most preferably, less than 0.3. The equivalent ratio of carboxyl groups in the carboxylic acid polymer to hydroxyl groups in the polyether mixture is preferably from 20:1 to 2:1.

The aforedescribed polyether mixture and carboxylic acid polymer are reacted under conditions effective to achieve partial cleavage of the polyethers and esterification of the polyethers and cleavage products thereof by the latter reactant. While the precise mechanism of said reaction and chemical structure of the resulting product are not known, it is believed that cleavage of some, but not all, of the ether linkages of the polyethers takes place and that the resulting cleavage products ultimately participate in the desired esterification of the acid groups originally present in the carboxylic acid polymer. Where the polymerized acid monomer is present in alkyl ester form (i.e., $R^2$ in the aforedescribed structure is $C_1$–$C_4$ alkyl), the esterification process may be alternatively described as interesterification wherein the $C_1$–$C_4$ alkyl group is displaced by the polyether or cleavage products thereof. It is preferred that the majority of the ether linkages in the starting polyethers remain uncleaved. In one embodiment of the invention, only from about 1 to 25% of such linkages undergo cleavage.

The desired reaction of the polyether and carboxylic acid polymer is catalyzed by a strong protic acid. Suitable protic acids are those substances having a pKa less than 0. Generally, the acid will be a stronger acid than a carboxylic acid. Preferred strong protic acids include arylsulfonic acids, alkylsulfonic acids, and sulfonic acid ion exchange resins. Inorganic as well organic acids may be utilized; the acid may be soluble or insoluble in the reaction mixture. Other suitable acids are hydrogen halides, halosulfonic acids, tetrafluoroboric acid, heteropolyacids, and sulfuric acids. Mixtures of different acids can be used. Illustrative examples of acids useful in the present invention include, but are not limited to, p-toluene sulfonic acid, trifluoromethanesulfonic acid, methane sulfonic acid, hydrochloric acid, phosphotungstic acid, "Nation" resins, "Amberlyst 15" resin, and the like. The protic acid may be added in salt form (e.g., zinc triflate), such that the acid is generated in situ by interaction with the carboxylic acid polymer.

The protic acid is used in an amount effective to promote the aforedescribed cleavage and esterification reactions. The preferred amount to be employed depends upon many factors, including the desired reaction rate, the types of reactants and catalyst used, reaction temperature, and other considerations. Generally, suitable amounts of protic acid are within the range of about 0.01 to 1 weight percent based on the quantity of polyether mixture to be reacted.

The process of the invention is conveniently performed by combining the polyether mixture, carboxylic acid polymer, and strong protic acid catalyst in any desired order or manner and heating the mixture at a temperature sufficient to cause the desired cleavage and esterification to proceed at sufficiently rapid rates. The progress of the esterification reaction can be followed by measuring the acid number, which will decrease as esterification proceeds, by conventional wet chemical analytical techniques. Generally, it will be advantageous to conduct said reaction until from 1 to 50% (more typically, 2 to 20%) of the carboxyl groups initially present in the carboxylic acid polymer are esterified.

Where the polyethers are comprised of repeating oxypropylene units derived from propylene oxide, the extent of polyether cleavage may be conveniently checked by monitoring the level of head-to-head ether linkages in the polyether by NMR. Such head-to-head linkages are apparently more susceptible to cleavage than head-to-tail linkages. The extent of reaction (i.e., esterification plus cleavage) may also be estimated by measurement of the acid number. When a desirable level of esterification and cleavage is achieved, the acid number will typically be less than the theoretical acid number (calculated from the relative proportions and functionalities of the starting materials) which would be attained if esterification of the original polyethers, but not any cleavage products thereof, had been completed.

The temperature selected should be sufficiently high so as to promote both the desired cleavage and esterification. While the minimum temperature required for such purpose will vary depending upon a number of factors, it has been found that where the polyethers are derived in whole or in part from propylene oxide, the carboxylic acid polymer is derived in whole or in part from acrylic acid, and the strong protic acid is a sulfonic acid, temperatures in excess of 140° C. (more preferably, 150° C. to 250° C.) are needed. In one embodiment of the invention, the reaction mixture is first heated to a somewhat lower temperature (e.g., 75° C. to 140° C.) for a period of time sufficient to accomplish substantial esterification (but not a significant amount of cleavage) of the initially charged polyether mixture, followed by heating at a temperature effective to cause polyether cleavage.

Esterification may be favored by removing the water or other by-products formed as a result of esterification from the reaction mixture (as well as any water present in the reactants initially) by appropriate means such as distillation or the like. Application of vacuum or an inert gas sparge may be helpful.

Once the appropriate degree of esterification and cleavage has been attained (typically, from about 0.5 to 18 hours), purification or further modification of the reaction product may be performed prior to its use as a cement additive. For example, the strong protic acid may be removed by any suitable method such as filtration, neutralization, or the like. The residual carboxylic acid groups in the additive may be either left in the acid form, or, if so desired, converted in whole or part to the salt form by reaction with a suitable source of alkali metal (e.g., sodium hydroxide, potassium hydroxide), alkaline earth metal (e.g., calcium hydroxide), ammonium (e.g., ammonia, alkyl amines such as triethanol amine and triisopropanol amine) or the like. The cation in the resulting salt thus may be an alkali metal cation. Ammonium as well as alkaline earth metal cations may also serve as the cation for such purpose. If the acid monomer used to prepare the carboxylic acid polymer was in anhydride form, some or all of the anhydride groups which may still be present in the polymer after reaction with the polyether may be converted into free acid or salt form by hydrolysis or other such means using methods conventional in the art. Cleavage or hydrolysis of the ester linkages between the polyether and the carboxylic acid polymer should, however, be minimized by careful selection of the conversion conditions utilized.

The cements with which the additives of the invention may be used are hydraulic cements, meaning cements which, when made into a paste with water, set and harden as a result of chemical reactions between the water and cement. Suitable cements include ordinary, quick-hardening, and moderate-heat portland cements, alumina cement, blast-furnace slag cement, and flash cement. Of these, portland cements of the ordinary and quick-hardening types are particularly desirable.

The quantity of additive used may vary with factors such as the degree of esterification and polyether cleavage attained and the relative amount of polyether mixture reacted with the monocarboxylic acid polymer. The additive quantity to be used in accordance with the invention is usually in the range of 0.01–10%, preferably 0.05 to 2%, based on the weight of dry cement. The quantity of water to be used for setting the cement is not critical; generally weight ratios of water to cement in the range 0.25:1 to 0.7:1, preferably 0.3:1 to 0.5:1 are satisfactory. Where desired, an aggregate such as pebbles, gravel, sand, pumice, or fired pearlite or mixtures thereof may be employed in conventional amounts. The amount of aggregate, for example, may typically comprise from about 40 to 80 percent by volume of the total cement composition.

Advantageously, the additives of this invention, which function as water reducing agents and/or superplasticizers, are used in combination with other known cement additives.

Among the optionally employable additional additives are: conventional hardening accelerators, e.g., metal chlorides such as calcium chloride and sodium chloride, metal sulfates, such as sodium sulfate, and organic amines such as triethanol-amine; ordinary hardening retarders, e.g. alcohols, sugars, starch and cellulose; reinforcing-steel corrosion inhibitors such as sodium nitrate and calcium nitrite; other water reducing agents such as ligninsulfonic acid salts, as well as salts of oxycarboxylic acid and formalin condensates of naphthalenesulfonic acid; air entrainers; other super plasticizers; shrinkage reducing agents; strength enhancers such as triisopropylamine; antifoaming agents such as tributyl phosphate; air entraining admixtures; and the like. The quantity of such an optional ingredient or ingredients is usually 0.1–6% by weight of the cement.

The manner of adding the additive of the invention to the cement may be the same as with ordinary cement admixtures. For example, the additive can be admixed with a suitable proportion of water and the resulting solution is mixed with cement and aggregate. As an alternative, a suitable amount of the additive may be added when cement, aggregate and water are mixed. Another method of introducing the additive is to add it to the dry cement prior to or after grinding. The additive can be added prior to, along with or subsequent to addition of the other components of the cement composition.

The concrete and the like incorporating the additive according to the invention may be applied in conventional ways. For example, it may be trowelled, filled in forms, applied by spraying, or injected by means of a caulking gun. Hardening or curing of the concrete and the like may be by any of the air drying, wet air, water and assisted (steam, autoclave, etc.) curing techniques. If desired, two or more such techniques may be combined. The respective curing conditions may be the same as in the past.

EXAMPLES

Example 1

This example demonstrates the preparation of a cement additive in accordance with the present invention using a mixture of monofunctional and difunctional polyethers.

A mixture containing (a) 309 g of a 65 weight % aqueous solution of poly(acrylic acid) having a number average molecular weight of approximately 2000 and an acid number, measured for the solution, of 388 mg KOH/g solution, (b) 800 g of a monofunctional polyether ("MPI") having a number average molecular weight of about 2000 corresponding to a hydroxyl number of 28 mg KOH/g, (c) 80 g of a difunctional poly(propylene glycol) having a number average molecular weight of about 4200, and (d) 8.6 g of p-toluene sulfonic acid monohydrate was heated in a 2 L reaction kettle equipped with a mechanical stirrer and an overhead takeoff with a condenser. MPI had been prepared by reacting methanol with ethylene oxide and propylene oxide (70:30 weight ratio) in the presence of an alkali metal hydroxide catalyst. The difunctional poly(propylene glycol) had been prepared using a double metal cyanide complex catalyst.

The mixture was heated to 125° C. over 2 hours while passing a stream of nitrogen through the kettle and while water was taken overhead. The mixture was thereafter heated at 170° C. for 5.5 hours. The product obtained had an acid number of 77 mg KOH/g. This compares to the initial acid number of 112 mg KOH/g for the mixture after the water had been removed and a calculated acid number of 90 mg KOH/g if it is assumed that all of the hydroxyl groups initially present on the MPI and the poly(propylene glycol) had reacted to form esters.

The performance of the product obtained in the manner was evaluated, both in acid form and as an aqueous suspension of the sodium salt, as a cement additive.

Example 2

This example, like Example 1, also demonstrates the preparation of a cement additive in accordance with the present invention using a mixture of polyethers. In this example, however, a difunctional poly(propylene glycol) having a number average molecular weight of about 4000 prepared using an alkali metal hydroxide catalyst was utilized.

A mixture containing 309 g of 65 weight % aqueous solution of a 2000 molecular weight poly(acrylic acid), 800 g of the MPI monofunctional polyether described in Example 1, and 8.6 g of p-toluene sulfonic acid was heated to 120° C. for 3 hours to remove water, then heated for 13 hours at 170° C. Intermediate samples were taken while the mixture was being heated at 170° C., with the sample taken at 7 hours having an acid number of 80 mg KOH/g and the sample taken at 10 hours having an acid number of 73 mg KOH/g. The final product had an acid number of 68 mg KOH/g.

Examples 3–11

A series of reaction products was prepared using the general procedures and reagents described in Example 1, but utilizing different monofunctional and difunctional polyethers. Details of the preparation are provided in Table 1. In each case, the reaction mixture was heated to about 140° C. to drive off the water and then heated to the indicated temperature for the time shown. "MP2" was a monofunctional polyether having a number average molecular weight of about 2000 made by polymerizing a mixture of ethylene oxide and propylene oxide (30:70 weight ratio) onto tripropylene glycol methyl ether using a zinc hexacyanocobaltate complex catalyst. "DP1" was a 2200 number average molecular weight difunctional poly(propylene glycol) made using a zinc hexacyanocobaltate complex catalyst. "DP2" was a 4200 number average molecular weight difunctional poly(propylene glycol) made using a zinc hexacyanocobaltate complex catalyst. "DP3" was an 8200 number average molecular weight difunctional poly(propylene glycol) made using a zinc hexacyanocobaltate complex catalyst. "DP4" was a 4000 number average molecular weight difunctional poly(propylene glycol) made using an alkali metal hydroxide catalyst.

Example 12

(Comparative)

This example demonstrates the preparation of a cement additive using only a monofunctional polyether.

A mixture was made of 38.5 g of a 65 weight % aqueous solution of poly(acrylic acid) having a number average molecular weight of 2000 with 100 g of monofunctional polyether MP1 and 1 g p-toluene sulfonic acid monohydrate. The mixture was heated to 130° C. over 2.5 hours to drive off water and then heated to 170° C.–180° C. for 3.5 hours to complete the reaction. Nitrogen flow through the reactor was used to help remove the water, which was then condensed and collected in an overhead receiver.

The resulting product had a final acid number of 69 mg KOH/g. This compares to the initial acid number of 121 on a water-free basis assuming no ester formation and an acid number of 99 on a water-free basis if all the hydroxyl groups initially present on the MP1 had reacted to form ester groups.

Example 13

(Comparative)

A larger batch of product was prepared using the procedures and reactants (including reactant ratios) described in Example 12. The reaction mixture was heated to 180° C.–190° C. and water was taken overhead.

Example 14

The reaction products obtained in Examples 1–13 were tested in mortar mixes. Slump was measured using a half-size slump cone; air content was determined using ASTM method C185. The results obtained using Essroc cement are summarized in Table 2. The results obtained using Saylor's cement are summarized in Table 3. To prepare these mixes, the required amounts of water and reaction product (test sample) were weighed into a mixing bowl; 1200 g cement and 2700 g sand (ASTM C778 graded) were added in accordance with the mix procedures of ASTM C305. All of the reaction products tested were capable of greatly increasing the slump of the mortar mix at a given water/cement ratio over the slump observed in the absence of the additive. However, comparative Examples 10, 12 and 13 demonstrate that products made in the absence of the difunctional polyether tend to entrain large amounts of air. While the addition of a defoamer (TBP) generally helped to reduce the amount of entrained air, acceptable entrained air levels were still difficult to achieve. The reaction products obtained in examples 1–9 and 11, which were prepared using mixtures of monofunctional and difunctional polyethers, did not entrain excess air on their own.

Example 15

The reaction products of Examples 1 and 13 were tested in a concrete mix. The cement additive performance of these reaction products as compared to a control (no additive) and a commercially available superplasticizer is summarized in Table 4. An air entraining admixture ("AEA") was also utilized in these tests. The ability to control air is necessary to obtain concrete with good freeze-thaw resistance. The reaction product from Example 13 entrained some air on its own. In this instance, no defoamer was needed to keep the entrained air level within the desired range, although varying the cement used or the additive level could result in excessive air entrainment. Additionally, the air void size distribution may not be the same as that provided by a conventional air entraining admixture. The reaction product from Example 1 did not by itself entrain air; however, it was found to be fully compatible with the commercial air entraining admixture so that the desirable level of entrained air could be readily achieved.

TABLE 2

| Additive | Water/ Cement | wt % additive on dry cement | Defoamer (% of additive) | Slump, mm | % Air |
|---|---|---|---|---|---|
| None | 0.50 | — | none | 72 | 4 |
| None | 0.48 | — | none | 49 | 8 |
| None | 0.42 | — | none | 20 | 9 |
| Example 3 | 0.42 | 0.2 | none | 100 | 8 |
| Example 4 | 0.42 | 0.2 | none | 106 | 8 |
| Example 7 | 0.42 | 0.2 | none | 95 | 8 |
| Example 8 | 0.42 | 0.2 | none | 102 | 6 |
| Example 9 | 0.42 | 0.2 | none | 86 | 6 |
| Example 11 | 0.42 | 0.2 | none | 86 | 10 |
| Example 10* | 0.42 | 0.2 | none | 133 | 26 |
| Example 10* | 0.42 | 0.2 | TBP (8%) | 117 | 13 |
| Example 12* | 0.42 | 0.3 | none | 116 | 17 |
| Example 12* | 0.42 | 0.2 | TBP (6%) | 60 | 6 |
| Example 13* | 0.42 | 0.3 | none | 130 | 26 |
| Example 13* | 0.42 | 0.3 | TBP (4%) | 80 | 5 |

*comparative
TBP = tributyl phosphate

TABLE 3

| Additive | Water/ Cement | wt % additive on dry cement | Defoamer (% of additive) | Slump, mm | % Air |
|---|---|---|---|---|---|
| none | 0.52 | — | none | 102 | 2 |
| none | 0.50 | — | none | 83 | 4 |
| none | 0.48 | — | none | 59 | 5 |
| none | 0.45 | — | none | 44 | 6 |
| none | 0.42 | — | none | 24 | 8 |
| Example 1 | 0.42 | 0.2 | none | 106 | 7 |
| Example 2 (7 hr) | 0.42 | 0.2 | none | 103 | 7 |
| Example 2 (10 hr) | 0.42 | 0.2 | none | 112 | 5 |
| Example 2 (13 hr) | 0.42 | 0.2 | none | 93 | 6 |
| Example 6 | 0.42 | 0.2 | none | 110 | 7 |
| Example 5 | 0.42 | 0.2 | none | 110 | 5 |
| For the following mixes made with the Example 5 additive, dosage was adjusted to give constant slump at varying w/c ratios | | | | | |
| Example 5 | 0.35 | 0.4 | none | 77 | 8 |
| Example 5 | 0.40 | 0.12 | none | 67 | 8 |
| Example 5 | 0.42 | 0.1 | none | 65 | 7 |
| Example 5 | 0.45 | 0.1 | none | 88 | 6 |

TABLE 1

| Example No. | Monofunctional Polyether (g) | Difunctional Polyether (g) | Mono/Di wt/wt | Polyacrylic Acid, g 65% sol. | p-Toluene Sulfonic Acid, g | Reaction Time, hr | Reaction Temp., C. | Final Acid No, mg KOH/g |
|---|---|---|---|---|---|---|---|---|
| 3 | MP1 (90) | DP1 (20) | 4.5 | 38.4 | 1.0 | 3 | 165 | 81 |
| 4 | MP1 (100) | DP1 (10) | 10 | 38.4 | 1.0 | 1 | 180 | 77 |
| 5 | MP1 (1200) | DP2 (120) | 10 | 46.1 | 12 | 7 | 170 | 75 |
| 6 | MP1 (100) | DP2 (5) | 20 | 38.4 | 1.0 | 4 | 165 | 72 |
| 7 | MP1 (1000) | DP3 (100) | 10 | 384 | 8.1 | 9 | 170 | 80 |
| 8 | MP1 (100) | DP4 (6.4) | 16 | 38.5 | 1.1 | 1 | 180 | 83 |
| 9 | MP1 (100) | DP4 (6.4) | 16 | 38.5 | 1.1 | 2 | 180 | 53 |
| 10 | MP1 (50) MP2 (50) | none | — | 38.9 | 1.2 | 2 | 180 | 73 |
| 11 | MP1 (47) MP2 (70) | DP2 (10) | 12 | 45.1 | 1.1 | 4 | 165 | 79 |

TABLE 3-continued

| Additive | Water/ Cement | wt % additive on dry cement | Defoamer (% of additive) | Slump, mm | % Air |
| --- | --- | --- | --- | --- | --- |
| Example 5 | 0.48 | 0.05 | none | 81 | 6 |
| Example 13* | 0.42 | 0.2 | none | 129 | 21 |
| Example 13* | 0.42 | 0.2 | TBP (5%) | 113 | 6 |
| Example 13* | 0.42 | 0.1 | none | 76 | 12 |
| Example 13* | 0.42 | 0.1 | TBP (7%) | 77 | 7 |

*comparative
TBP = tributyl phosphate

TABLE 4

| Additive | Water/ Cement | Additive, % solids on cement | AEA, wt % on cement | Slump, in | Air, % | Initial set (hrs) | Final set (hrs) | Time to total slump loss (.25"), hrs. | Compressive strength, psi | | |
| --- | --- | --- | --- | --- | --- | --- | --- | --- | --- | --- | --- |
| | | | | | | | | | 3 days | 7 days | 28 days |
| None* | 0.47 | 0 | 0.05 | 3.25 | 6.5 | 3.3 | 4.2 | 2.6 | 3140 | 4180 | 4970 |
| Rheobuild 1000* | 0.40 | 0.29 | 0.06 | 4.0 | 6 | 3.4 | 4.8 | 1.5 | 4560 | 5280 | 6010 |
| Example 1 | 0.40 | 0.13 | 0.05 | 2.75 | 7.2 | 3.1 | 4.4 | 1.7 | 4460 | 5090 | 5590 |
| Example 1 | 0.40 | 0.20 | 0.05 | 4.25 | 5 | 3.7 | 5.2 | 2.5 | 5030 | 5950 | 6560 |
| Example 13* | 0.40 | 0.15 | 0 | 3.75 | 6.3 | 3.5 | 4.8 | 1.7 | 5400 | 6440 | 6620 |

*comparative (a commercially available water-reducing agent)
AEA = Air Entraining Admixture; "Daravair" neutralized resin, a commercial air entraining admixture available from W. R. Grace & Co., was used.

I claim:

1. A cement additive containing carboxylic acid groups produced by reaction of (a) a carboxylic acid polymer prepared by polymerizing a polymerizable acid monomer containing at least one ethylenically unsaturated group in conjugation with a carboxyl group selected from the group consisting of carboxylic acid, carboxylic anhydride and carboxylic ester groups and (b) a polyether mixture comprising (i) a monofunctional polyether prepared by polymerizing a first epoxide selected from the group consisting of $C_2$-$C_4$ epoxides and mixtures thereof onto a monofunctional initiator and (ii) a difunctional polyether prepared by polymerizing a second epoxide selected from the group consisting of $C_2$-$C_4$ epoxides and mixtures thereof, which may be the same as or different from the first epoxide, onto a difunctional initiator, wherein (a) and (b) are reacted under conditions effective to achieve partial cleavage of the polyether mixture and esterification of the polyether mixture and cleavage products thereof by the carboxylic acid polymer.

2. The cement additive of claim 1 wherein at least a portion of the carboxylic acid groups are in salt form.

3. The cement additive of claim 1 wherein the polymerizable acid monomer is selected from the group consisting of methyl acrylate, methyl methacrylate, acrylic acid, methacrylic acid, maleic acid, maleic anhydride and mixtures thereof.

4. The cement additive of claim 1 wherein the carboxylic polymer is a homopolymer of the polymerizable acid monomer.

5. The cement additive of claim 1 wherein the carboxylic acid polymer has a number average molecular weight of from 500 to 2,000,000.

6. The cement additive of claim 1 wherein the first epoxide is selected from the group consisting of ethylene oxide, propylene oxide, and mixtures thereof and the second epoxide is selected from the group consisting of ethylene oxide, propylene oxide, and mixtures thereof.

7. The cement additive of claim 1 wherein the monofunctional polyether has a number average molecular weight of from 500 to 20,000 and the difunctional polyether has a number average molecular weight of from 500 to 20,000.

8. The cement additive of claim 1 wherein the polymerizable acid monomer has the structure

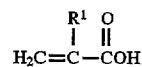

wherein $R^1$ is hydrogen or $C_1$-$C_4$ alkyl.

9. The cement additive of claim 1 wherein the weight ratio of monofunctional polyether to difunctional polyether is from 3:1 to 25:1.

10. A cement additive containing carboxylic acid groups prepared by reaction of (a) a carboxylic acid polymer prepared by polymerizing acrylic acid and (b) a polyether mixture comprising (i) a monofunctional polyether prepared by polymerizing a first epoxide selected from the group consisting of ethylene oxide, propylene oxide and mixtures thereof onto a monoalcohol initiator and (ii) a difunctional polyether prepared by polymerizing a second epoxide selected from the group consisting of ethylene oxide, propylene oxide and mixtures thereof, which may be the same as or different from the first epoxide, onto a di-alcohol initiator, wherein (a) and (b) are reacted in the presence of an acid catalyst having a pKa of less than 0 under conditions effective to achieve partial cleavage of the polyether mixture and esterification of the polyether mixture and cleavage products thereof by the carboxylic acid polymer.

11. The cement additive of claim 10 wherein the weight ratio of monofunctional polyether to difunctional polyether is from 3:1 to 25:1.

12. The cement additive of claim 11 wherein the carboxylic acid polymer is a homopolymer of acrylic acid.

13. The cement additive of claim 11 wherein the number average molecular weight of the carboxylic acid polymer is from 500 to 10,000.

14. The cement additive of claim 11 wherein the second epoxide is propylene oxide.

15. The cement additive of claim 11 wherein the first epoxide is a mixture of ethylene oxide and propylene oxide.

16. The cement additive of claim 11 wherein at least a portion of the carboxylic acid groups are in salt form.

17. The cement additive of claim 11 wherein the monofunctional polyether has a number average molecular weight of from 500 to 20,000 and the difunctional polyether has a number average molecular weight of from 200 to 20,000.

18. A cement composition comprised of cement and from 0.05 to 2% by weight, based on the dry weight of cement, of a cement additive containing carboxylic acid groups produced by a reaction of (a) a carboxylic acid polymer prepared by polymerizing a polymerizable acid monomer containing at least one ethylenically unsaturated group in conjugation with a carboxyl group selected from the group consisting of carboxylic acid, carboxylic anhydride and carboxylic ester groups and (b) a polyether mixture comprising (i) a monofunctional polyether prepared by polymerizing a first epoxide selected from the group consisting of $C_2$–$C_4$ epoxides and mixtures thereof, onto a monofunctional initiator and (ii) a difunctional polyether prepared by polymerizing a second epoxide selected from the group consisting of $C_2$–$C_4$ epoxides and mixtures thereof, which may be the same as or different from the first epoxide, onto a di-functional initiator, wherein (a) and (b) are reacted under conditions effective to achieve partial cleavage of the polyether mixture and esterification of the polyether mixture and cleavage products thereof by the carboxylic acid polymer.

19. The cement composition of claim 18 additionally comprising water.

20. The cement composition of claim 18 additionally comprising aggregate.

21. A method of preparing a cement additive containing carboxylic acid groups comprising reacting (a) a carboxylic acid polymer prepared by polymerizing a polymerizable acid monomer containing at least one ethylenically unsaturated group in conjugation with a carboxyl group selected from the group consisting of carboxylic acid, carboxylic anhydride and carboxylic ester groups; and (b) a polyether mixture comprising
  (i) a monofunctional polyether prepared by polymerizing a first epoxide selected from the group consisting of $C_2$–$C_4$ epoxides and mixtures thereof onto a monofunctional initiator; and
  (ii) a difunctional polyether prepared by polymerizing a second epoxide selected from the group consisting of $C_2$–$C_4$ epoxides and mixtures thereof, which may be the same as or different from the first epoxide, onto a difunctional initiator;

in the presence of an acid catalyst having a pKa of less than 0 at a temperature effective to achieve partial cleavage of the polyether mixture and esterification of the polyether mixture and cleavage products thereof by the carboxylic acid polymer.

\* \* \* \* \*